(12) United States Patent
Walrand et al.

(10) Patent No.: US 6,711,125 B1
(45) Date of Patent: Mar. 23, 2004

(54) PROVISIONING NETWORKS FOR RELIABLE QUALITY OF SERVICE

(75) Inventors: Jean Walrand, Berkeley, CA (US); Rajarshi Gupta, Berkeley, CA (US); Ayman Fawaz, Berkeley, CA (US)

(73) Assignee: Extreme Networks, Santa Clara, CA (US)

( * ) Notice: Subject to any disclaimer, the term of this patent is extended or adjusted under 35 U.S.C. 154(b) by 0 days.

(21) Appl. No.: 09/365,607

(22) Filed: Aug. 2, 1999

(51) Int. Cl.$^7$ .............................................. G08C 15/00
(52) U.S. Cl. ...................................................... 370/223
(58) Field of Search ................................ 370/221, 222, 370/223, 224, 225, 228, 249, 217, 218

(56) References Cited

U.S. PATENT DOCUMENTS

| | | | |
|---|---|---|---|
| 4,891,805 A | * 1/1990 | Fallin | 370/229 |
| 5,029,164 A | * 7/1991 | Goldstein et al. | 370/235 |
| 5,313,454 A | 5/1994 | Bustini et al. | 370/13 |
| 5,327,427 A | * 7/1994 | Sandesara | 370/222 |
| 5,361,255 A | 11/1994 | Diaz et al. | 370/58.1 |
| 5,440,549 A | 8/1995 | Min et al. | 370/60 |
| 5,485,455 A | 1/1996 | Dobbins et al. | 370/60 |
| 5,491,694 A | 2/1996 | Oliver et al. | 370/85.4 |
| 5,519,698 A | 5/1996 | Lyles et al. | 370/60 |
| 5,526,352 A | 6/1996 | Min et al. | 370/60 |
| 5,631,903 A | * 5/1997 | Dianda et al. | 370/401 |
| 5,675,576 A | 10/1997 | Kalampoukas et al. | 370/232 |
| 5,734,486 A | 3/1998 | Guillemot et al. | 359/139 |
| 5,742,772 A | 4/1998 | Sreenan | 395/200.56 |
| 5,790,546 A | 8/1998 | Dobbins et al. | 370/400 |
| 5,872,773 A | * 2/1999 | Katzela et al. | 370/256 |
| 6,072,772 A | * 6/2000 | Charny et al. | 370/229 |
| 6,222,820 B1 | * 4/2001 | Hamami | 370/218 |
| 6,272,107 B1 | * 8/2001 | Rochberger et al. | 370/216 |
| 6,418,139 B1 | * 7/2002 | Akhtar | 370/225 |

* cited by examiner

Primary Examiner—Chau Nguyen
Assistant Examiner—Keith M. George
(74) Attorney, Agent, or Firm—Blakely Sokoloff Taylor & Zafman LLP

(57) ABSTRACT

A system and method in accordance with the invention provides efficient allocation of network resources to network virtual connections while providing reliable and guaranteed quality of service. Such a system is generally used in a network that includes a plurality of nodes and a plurality of links interconnecting the nodes. In accordance with an embodiment of the invention, for each connection in the network established between a pair of nodes, a normal path $n_i$ between the nodes having a rate $N_i$ is established and an alternate, or backup, path $b_i$ having a rate $B_i$ is established. Information is only transmitted on the backup path in the event of a failure on the normal path. The system further maintains information for each link as to the resources, such as bandwidth, utilized by the connections. The system then utilizes the maintained information to determine whether new connections can be accommodated and still meet quality of service guarantees. An embodiment of the invention can also be adapted for use in a network that has two attachments to an external network (such as the Internet) and still use resources efficiently.

12 Claims, 8 Drawing Sheets

PROVISIONING NETWORKS FOR RELIABLE QUALITY OF SERVICE

FIELD OF THE INVENTION

The invention relates generally to data networks. More specifically, the invention relates to providing a guaranteed quality of service for connections in a packet-switched network.

BACKGROUND

In communications technology, there is an ever-increasing demand for high-performance networks. This increased demand has led to the development of improved networks capable of handling larger volumes of data with smaller delays.

Communications networks, such as ATM networks or the Internet, are generally formed with a number of transmission links interconnected with switches. A transmission link is any medium through which signals are communicated and can be single or multiple twisted pairs, optical fiber, coaxial cable, radio links, or other mediums. A switch is a device with one or more input ports and one or more output ports. The switch directs bits arriving at an input port to the appropriate output port. Switching in communications is accomplished using one of two methods: circuit switching and packet switching. Only packet switching is relevant for the purposes of the present discussion.

In packet switching, the data in a data stream is divided into "packets." In addition to a portion of data, each packet carries various identifying information about the data. Such identifying information includes routing information, for instance, source and destination addresses for the data. When a packet arrives at a switch, it is stored in a buffer. The switch looks at the routing information in the packet and routes the packet to the appropriate output port. The packets are then forwarded one "hop" (or switch) at a time, until they reach their destination.

Generally in packet switching, each packet in a particular data stream does not necessarily follow the same path to its destination as the others. Nonetheless, certain types of packet switching, e.g., ATM, do specify the path that the packets are to follow between the switches for a particular end-to-end connection. Such a predetermined path is typically referred to as a "virtual channel" or "virtual connection."

Unlike general packet switching where packets are not guaranteed to arrive in the order they were sent, when virtual channels are specified, all of the packets follow the same route along the virtual channel, thereby guaranteeing the order of arrival. These "virtual connections" have greatly enhanced the performance of networks in using resources efficiently and can often provide a minimum "quality of service". "Quality of service" generally refers to guaranteed bounds on the delay, loss rate, available throughput, and/or other measures of performance.

As the applications of data transmission mature, the need for guaranteed quality of service is increasing. Several networks have attempted to provide a guaranteed quality of service. For instance, Asynchronous Transfer Mode (ATM) networks provide guaranteed bandwidth, loss rate, and delays for each virtual connection. To do so, ATM networks utilize (1) traffic policing, and (2) connection admission. In one type of ATM service, variable bit rate—real time (VBR-rt), traffic policing is carried out at the network switches, which set aside sufficient buffer space to absorb the traffic bursts and sufficient transmission rate to accommodate the average rate of traffic through the switch based on values provided by the connection request. A connection admission controller assures that no connection is admitted when the network switches have insufficient non-committed buffer space and transmission rate to carry the requested connection. In this manner, VBR-rt ATM can guarantee performance within the parameters defined by peak rate, average rate, and burst size. Other types of networks, such as Frame Relay, can provide similar guarantees.

Although ATM provides certain guarantees on quality of service, this protocol generally depends upon a fully operational network. For instance, if any part of a virtual connection in an ATM network fails, the entire virtual connection will fail and a new virtual connection will need to be established. While the new virtual connection may provide guarantees of quality of service, these guarantees may not reach the same standards as those of the original virtual connection. Therefore, in some versions of ATM, to accommodate a link failure, two paths are set up for each connection instead of one: a normal path and a backup path in case the normal path fails. Data is sent on both virtual paths simultaneously. If the normal path fails, then the data stream from the backup path is used. Otherwise, the data from the backup path is ignored.

Another method of providing more reliable transmission services in the event of a network failure and similar to that described for ATM is utilized in Synchronous Optical Network (SONET). SONET transmission links are typically arranged in dual rings that interconnect the switches. Between any two switches on the rings there are two disjoint paths: one clockwise path and one counterclockwise path. SONET sends every bit stream from its source switch to its destination switch simultaneously on each path. The destination switch monitors the two copies of the bit stream and uses one stream by default. If the default stream fails, e.g., as a result of a fault along its path, the destination switch uses the alternate copy of the bit stream.

Although both SONET and ATM provide systems where transmissions are robust against failures on the rings, they are both also very wasteful of valuable resources. In SONET, the resources used to support the backup paths cannot be used by other connections, even when there is no network failure. In ATM, these resources cannot be committed to other connections.

Another type of network protocol that attempts to guarantee quality of service is the Internet Protocol (IP). Although originally designed as a "best effort" protocol without guarantees, and without using virtual connections, several variations have been developed that provide more control over packet delivery. One such variation is referred to as "differentiated services" or DiffServ. Another variation is "multiprotocol label switching" or MPLS. Both of these variations use scheduling algorithms at the switches (routers) that allocate different fractions of the available transmission rate to various queues. Packets are placed in predetermined queues in accordance with information carried in each packet. The queues are multiplexed according to the scheduling algorithm. When performed properly, the scheduling algorithm places packets on the transmission line from each queue to provide a guaranteed transmission rate for the queue.

Even in "best effort" form, IP networks are inherently reliable. IP accommodates link failures by updating routing tables in the switches. Periodically, e.g., every few seconds, the switches exchange information about their preferred paths to destinations. As a failure occurs, the information regarding the failure gets propagated through this exchange mechanism. Hence, the network can automatically adapt to any network failures. Nonetheless, this propagation and re-routing exchange takes considerable time and is not suitable for real-time applications.

SUMMARY

A system and method in accordance with the invention overcomes the deficiencies as described above and provides a system that efficiently allocates resources while providing reliable and guaranteed quality of service. Such a system is generally used in a network that includes a plurality of nodes and a plurality of links interconnecting the nodes. In accordance with an embodiment of the invention, for each connection i in the network established between a pair of nodes, a normal path $n_i$ between the nodes having a rate $N_i$ is established and an alternate, or backup, path $b_i$ having a rate $B_i$ is established.

For each link comprising a normal path $n_i$, the system maintains information as to the resources utilized by the connections. For instance, in one embodiment of the invention, the system tracks the bandwidth A(j) reserved for connections carried on each link j in the absence of network failures using the equation $$A(j) = \sum_i N_i 1\{j \in n_i\}.$$

The system further tracks the bandwidth reserved on each link j in the event of a network failure f using the equation $$A(j; f) = \sum_i N_i 1\{j \in n_i \text{ and } f \notin n_i\} + \sum_i B_i 1\{j \in b_i \text{ and } f \notin b_i \text{ and } f \in n_i\}.$$

Information is transmitted for each connection over the designated normal path, and not the backup path, until a failure occurs on the normal path. Once a failure occurs, then the connection is rerouted over its backup path.

Upon receipt of a new connection request, a system in accordance with the invention selects a potential normal path and backup path for the new connection and then evaluates whether adequate resources are available on the selected path to support the new connection. To perform such evaluation, the system will update the values of A(j) and A(j;f) to account for the new connection and then determine if the resources available on any particular link or node are exceeded. If exceeded, the connection is rejected and the quantities of A(j) and A(j;f) are returned to their original values.

One embodiment of the invention can additionally accommodate an event in which there are more than two paths (e.g., a normal path and a backup path) for a given connection, for instance a network that is doubly-attached to the Internet. In such a network, packets destined for the same node may arrive at either of the two nodes attaching the network to the Internet. At each attachment node, a normal path and a backup path may be established. If there is more than minimal overlap among the links and nodes of any two of the paths, then, in accordance with an embodiment of the invention, only one queue is designated in the overlapping nodes to accommodate the overlapping paths. Thus, network resources are used efficiently.

BRIEF DESCRIPTION OF THE DRAWINGS

The present invention is described with respect to particular exemplary embodiments thereof and reference is accordingly made to the drawings in which.

DETAILED DESCRIPTION

Figure 1:
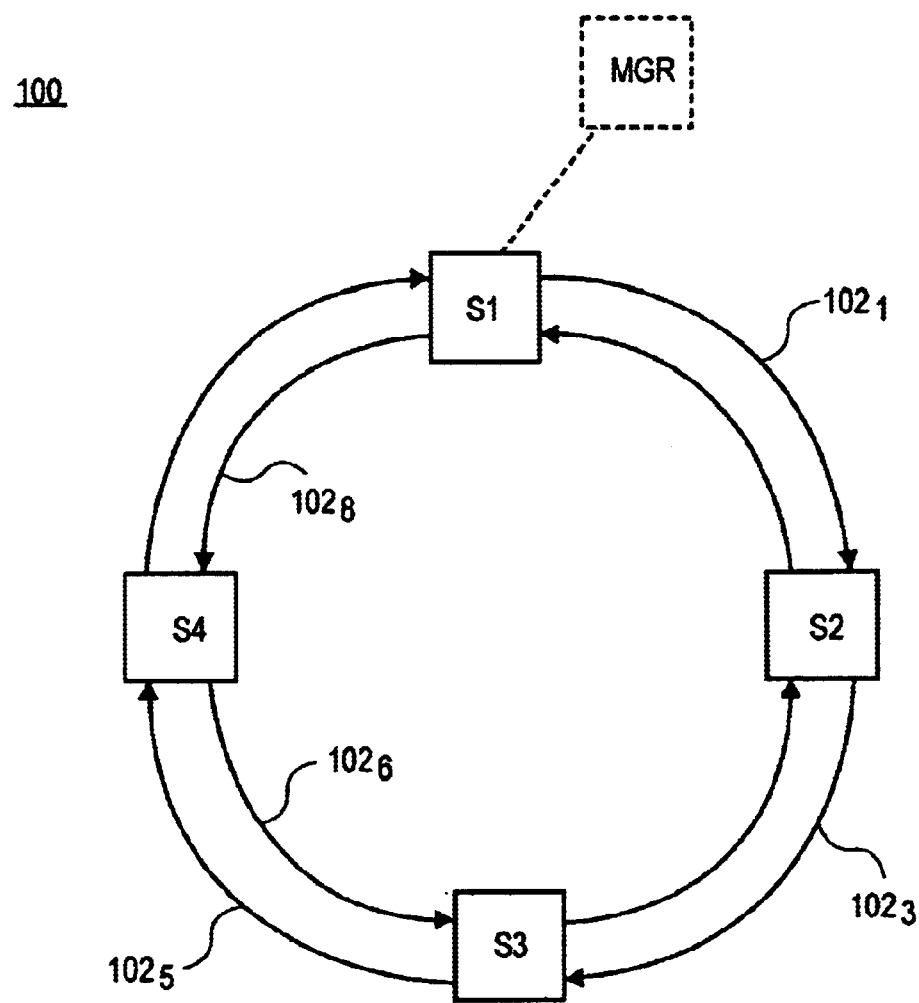
FIG. 1 is a generalized block diagram of a network having a ring topology in accordance with an embodiment of the invention.

A system and method in accordance with the invention allocates resources efficiently in a packet-switched network while simultaneously providing reliable connections with a guaranteed quality of service. One embodiment of the invention utilizes a ring topology such as that shown in network 100 of FIG. 1. The network includes nodes, S1–S4, (e.g., switches) that are interconnected by pairs of unidirectional links 102. Virtual-type connections are formed between respective pairs of switches. For instance, in FIG. 1, a connection may be formed between S1 and S3. A second connection may be formed between S2 and S4. And a third connection may be formed between S2 and S3.

For each connection, data travels on a route, or path, from its source node to its destination node via various links. More than one path is often possible for a given connection. For instance, one path for a connection between S1 and S3 may be from S1 to S2, via link $102_1$, and from S2 to S3, via link $102_3$ (clockwise). A second path for the same S1 to S3 connection would be from S1 to S4, via link $102_8$, and from S4 to S3, via link $102_6$ (counter-clockwise).

In accordance with an embodiment of the invention, every connection i in network 100 is given a normal path, $n_i$, and a backup path, $b_i$. For a connection formed between S1 and S3, a normal path may be chosen as the clockwise path through S2 while the backup path would be the counter-clockwise path through S4. Therefore, if there were a failure in link $102_1$, link $102_3$, or node S2, then the connection would use the backup path through S4. Until a failure occurs, however, only the normal path is used to transmit information—not the backup path.

To implement the rerouting of a connection i along its backup path $b_i$ when a failure f occurs along its normal path $n_i$, one or more network nodes detect the failure f and broadcast that fault condition to other nodes. Each node is configured with a table that specifies, for all i and f, whether to reroute a packet of connection i on its backup path depending on the fault condition f. After a fault condition has been repaired, the nodes are informed of this repair and return to using the normal paths.

Each connection is also characterized by two rates, $N_i$ and $B_i$. $N_i$ is the normal rate—the rate for the normal path of connection i that can be guaranteed in the absence of a failure in its normal path. $B_i$ is the backup rate—the rate for backup path $b_i$ that can be guaranteed in the event of a failure in the normal path of connection i (excluding a failure in the node of ingress or the node of egress). $N_i$ and $B_i$ can be the same rate, in the same embodiments, or different rates, but $B_i \leq N_i$. As well, each connection i is given an indicator, $P_i$, of whether its normal path, $n_i$, is clockwise ($P_i=0$) or counter-clockwise ($P_i=1$).

In accordance with an embodiment of the invention, to efficiently assign paths with sufficient bandwidth and other quality of service guarantees to new connections, the rate already being used on various links by already existing connections must be known. In a network such as that of FIG. 1, that already has a set of connections established for which there are no failures, the rate through a particular link j can be determined by summing $N_i$ of all the connections i whose normal path $n_i$ uses link j. This utilized rate, designated A(j), can be expressed as follows:

$$A(j) = \sum_i N_i 1\{j \in n_i\}$$

The notation utilized in the equation above is described as follows: if p is a proposition, then 1{p} is equal to 1 if proposition p is true and is equal to 0 otherwise.

Figure 2:
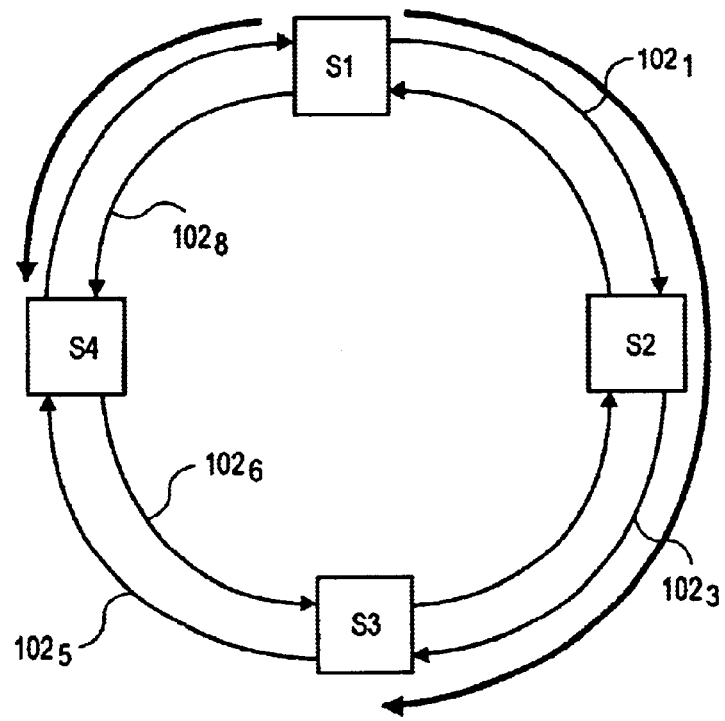
FIGS. 2 and 3 illustrate the paths of various connections formed using the network illustrated in FIG. 1.
Figure 3:
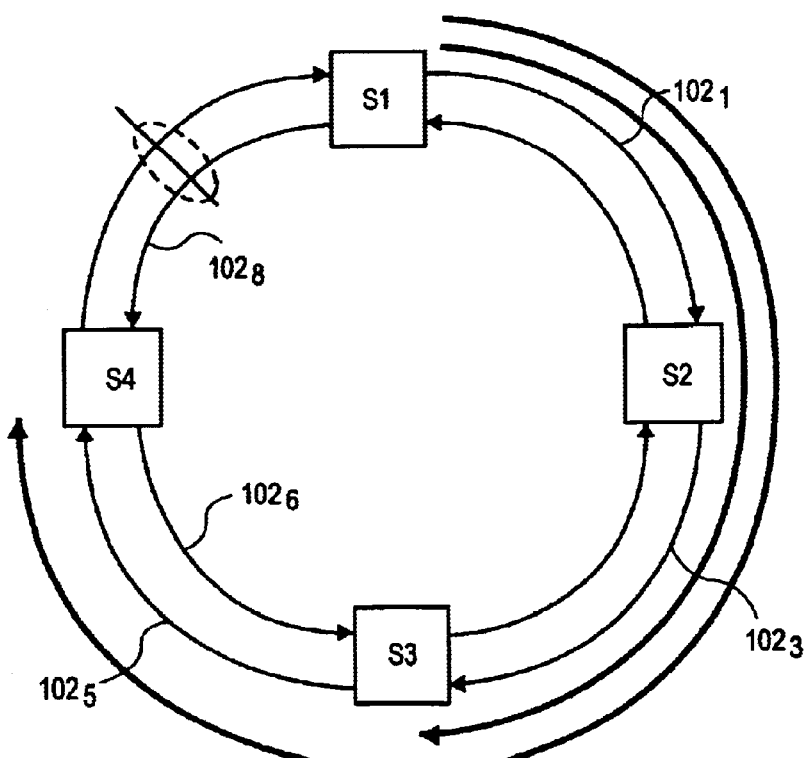

A failure f can be a failure with one of the links, one of the nodes, or any other failure obstructing the normal path. In the event of a failure f in the network 100, then every connection i whose normal path $n_i$ uses f must be rerouted along its backup path $b_i$. For instance, as shown in FIG. 2, a first connection is formed from node S1 to node S3 having a clockwise normal path through node S2 and links $102_1$ and $102_3$. A second connection is formed from node S1 to node S4, having a counter-clockwise normal path via link $102_8$. In the event of a failure f on link $102_8$, the connection between S1 and S4 will have to be rerouted along its backup path: clockwise through nodes S2 and S3 and links $102_1$, $102_3$, and $102_5$. Hence, as shown in FIG. 3, link $102_1$, for example, will carry all of its normal traffic from the S1–S3 connection as well as rerouted traffic from the S1–S4 connection.

In accordance with an embodiment of the invention, in order to accommodate a failure, the rate each link j must carry in the event of a failure must be determined to account for rerouting. The rate A(j;f) that a link j must carry in the event of a failure f is determined by summing the rate $N_i$ of all the connections i whose normal path $n_i$ uses link j (but not element f), summing the rate $B_i$ of all connections i whose normal path $n_i$ uses f and whose backup path $b_i$ uses link j (but not element f), and then adding the two sums. In other words, $$A(j; f) = \sum_i N_i 1\{j \in n_i \text{ and } f \notin n_i\} + \sum_i B_i 1\{j \in b_i \text{ and } f \notin b_i \text{ and } f \in n_i\}.$$

As will be understood by those of skill in the art, if the failure occurs with the ingress (source) or egress (destination) node of connection i, then the connection i cannot be rerouted.

In accordance with an embodiment of the invention, new connections are accepted only when the links to form its normal and backup paths can accommodate the additional rate demands. In other words, for a new connection to be accepted, $$A(j) < R_j \text{ and } A(j;f) < R_j \text{ for all } j \text{ and } f,$$

even after adding the new connection. In the above equation, $R_j$ designates the transmission rate of link j.

Figure 4:
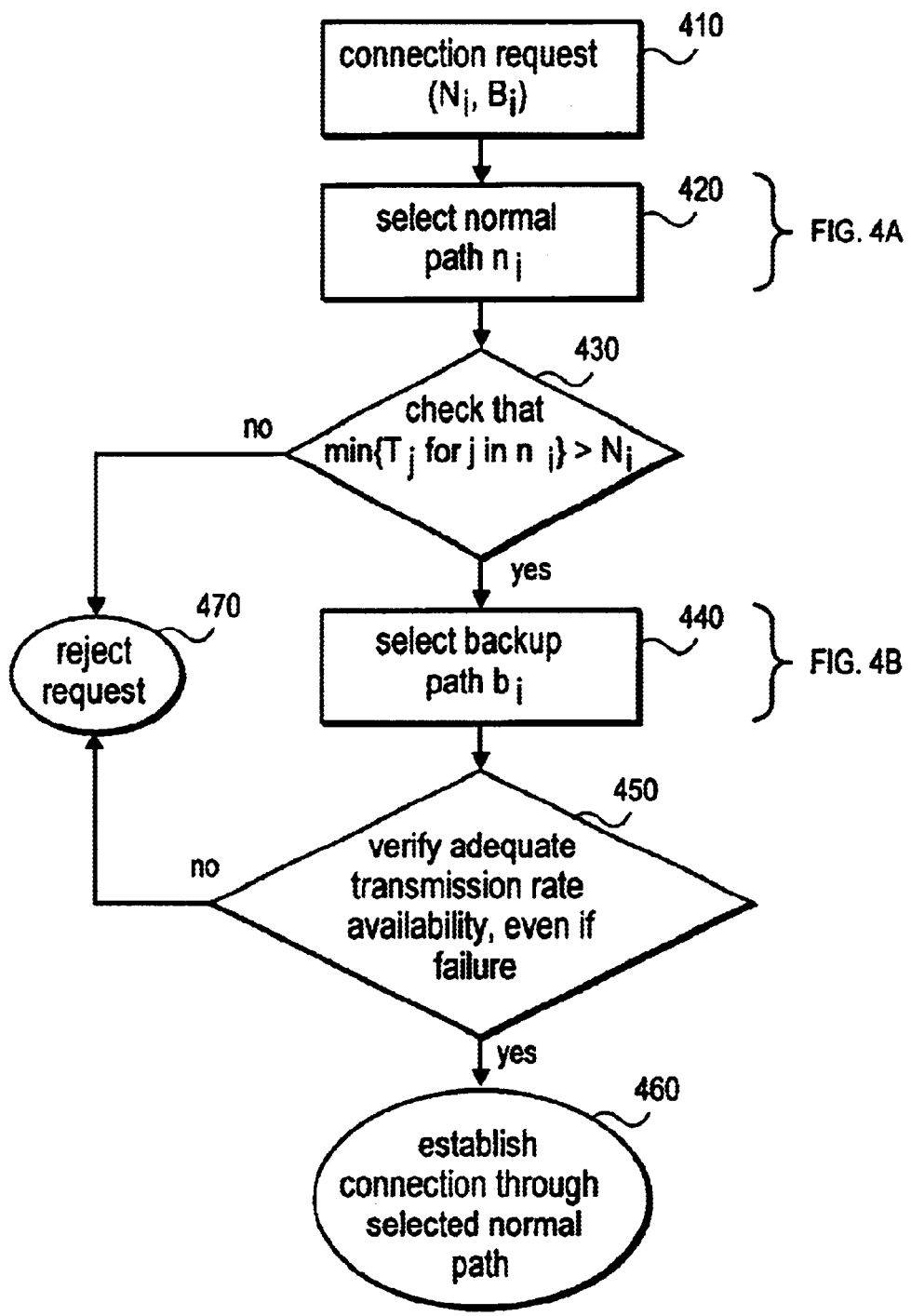
FIGS. 4, 4a, and 4b are flow diagrams illustrating the steps taken in accordance with an embodiment of the invention.

When a new connection is requested, a normal path and a backup path must be selected, the links of each path containing enough spare transmission to accommodate reroutes in the event of a failure. Referring to FIG. 4, when a new connection is requested, step 410, a potential normal path $n_i$ is selected, step 420. As will be understood, the normal rate $N_i$ may be designated in some embodiments by the connection request itself. In other embodiments, the normal rate may be designated by other means. For instance, all connections could be predesignated to have a particular rate.

Figure 4A:
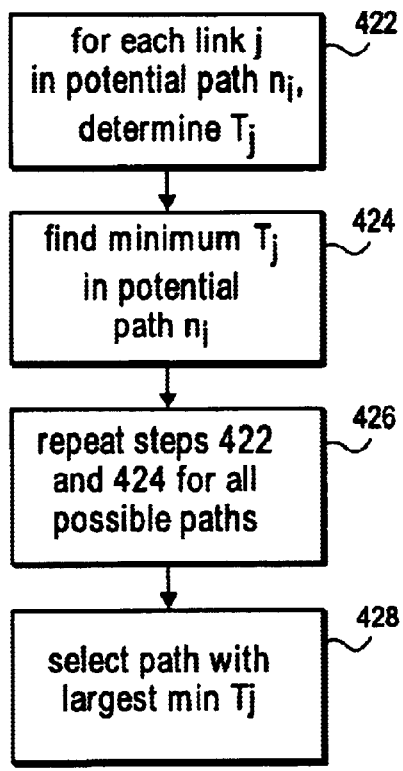

More specifically, in one embodiment of the invention, one method for choosing the normal path for a connection is to choose the path with the largest amount of spare transmission rate. Step 420 is divided into several substeps as shown in FIG. 4a. First, step 422, for each link j in a potential path $n_i$, the spare transmission rate, $T_j$, is determined, where $$T_j = R_j - \max\{A(j); A(j;f) \text{ for all potential } f\}.$$

Once $T_j$ for each link in a potential path is determined, then the minimum $T_j$ is taken, step 424, as representative of the spare transmission rate available on the potential path. In step 426, steps 422 and 424 are repeated for all potential paths R Then in step 428, the minimum spare transmission rate, $T_j$, for each potential path is compared, and the path with the largest spare transmission rate is selected for the normal path of the new connection. Other embodiments of the invention may simply choose a path that can accommodate the rate demands, without regard to which path has the most spare bandwidth available.

In the above discussions, it is assumed that there is only one failure f at a time. Nonetheless, one of ordinary skill in the art should be able to easily adapt the principles discussed herein in the event of more than one failure.

Referring again to FIG. 4, once the normal path is selected, it must be verified that the transmission rate added by the new connection will not exceed link capacities, even in the event of a failure on a link not on the normal path, step 430. That is, it must be verified that the minimum available bandwidth in the selected normal path is larger than $N_i$. If that condition is not satisfied, then the request for the new connection i is rejected, step 470. If the condition is satisfied, then the backup path $b_i$ is selected in step 440.

Figure 4B:
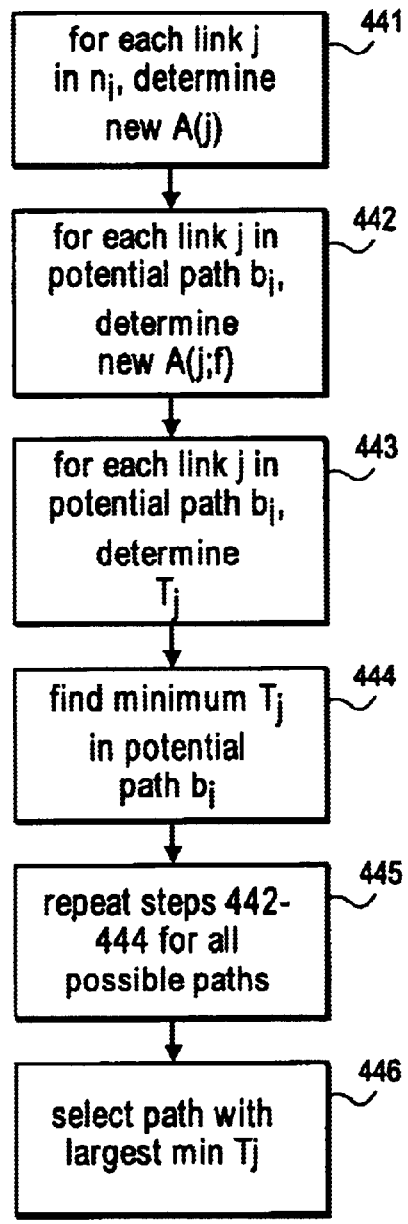

Backup path selection, step 440, is also divided into substeps shown in FIG. 4b. For each link j in the newly selected normal path $n_i$, an updated A(j) is determined, step

441, by adding the new rate $N_i$ to that already carried by the link for pre-existing connections as follows:

$$A(j):=A(j)+N_i 1\{j \in n_i\}.$$

In step 442, for a potential backup path $b_i$, the rate $A(j;f)$ on each link j in case of a failure f is determined:

$$A(j;f):=A(j;f)+N_i 1\{j \in n_i \text{ and } f \notin n_i\}+B_i 1\{j \in b_i \text{ and } f \notin b_i \text{ and } f \in n_i\}.$$

In step 443, the available bandwidth $T_j$ on each link j of the backup path $b_i$ is then determined:

$$T_j = R_j - \max\{A(j), A(j;f)\}.$$

Once $T_j$ for each link in the potential path is determined, then the minimum $T_j$ is taken, in step 444, as representative of the spare transmission rate available on the potential path. In step 445, steps 442–444 are repeated for all potential paths $b_i$. Finally, in step 446, the potential backup path with the largest minimum value of $T_j$ is selected.

Referring again to FIG. 4, the selected backup path $b_i$ is acceptable if its minimum value of $T_j$ is non-negative, as determined in step 450. If the minimum $T_j$ is negative, then the connection is rejected, in step 470. Finally, adequate transmission rate is determined, then a connection can be established, step 460.

Although the above steps in FIG. 4 are described as being performed in a specified order, it is to be understood that the order of many of these steps can be altered and some can be performed simultaneously. For instance, one embodiment of the invention simultaneously selects a potential normal path and a potential backup path, and then proceeds to verify available bandwidth. Moreover, the particular embodiment of the invention described above is suitable when the number of potential normal paths and backup paths is small (e.g., in a ring network). But if there are many potential paths, then other embodiments may be preferred that can be easily devised by those of skill in the art based on dynamic programming.

In one embodiment of the invention, the steps for the connection admission procedure described with respect to FIG. 4, as well as the general maintenance of the quantities $A(j)$ and $A(j;f)$ is performed by a network management station, or master node, coupled to the network. In one embodiment, such a master node may be on the ring shown in FIG. 1, e.g., master node may be S1. In another embodiment, the master node may be off-ring, but in communication with the network, e.g., master node M may be coupled to node S1 as shown in phantom in FIG. 1. In other embodiments, the responsibilities for the connection admission procedure and maintenance of the quantities $A(j)$ and $A(j;f)$ may be shared among several nodes.

Although the above method is described assuming that a maximum rate $R_j$ can be carried on each link, nonetheless, in some embodiments of the invention, overbooking of a particular link may be possible because not all flows transmit at their peak rate all the time. For instance, if $A(j)<R_j$ and $A(j;f)<R_j$ hold true with a probability close to one for the rates averaged over a short time interval, these average rates will typically be significantly smaller than the guaranteed rates. Overbooking can be captured by replacing every link rate $R_j$ by some multiple (larger than 1) of $R_j$. For instance, if measurements reveal that the actual rates used on the links are only 50% of the reserved rates, then the network operator may replace $R_j$ with $2R_j$, basing calculations on the assumption that the average connection rates are half as large as their guaranteed rate.

In accordance with an embodiment of the invention, since data is only transmitted on the backup path in the event of a failure, network resources can be used more efficiently. For instance, in a network without failures, a particular link j may be able to carry the normal path of a connection that utilizes a later failed element f Upon the occurrence of f, that connection will be rerouted to use a different link while simultaneously other connections whose normal paths utilized f may be rerouted through the link j, where their backup paths do not use f.

Further although an embodiment in accordance with the invention has been described with respect to provisioning connections according to bandwidth requirements, a system and method in accordance with the invention can be extended to other situations. For instance, VBR ATM sets aside buffer space for each connection established. In an embodiment of the invention extended to a VBR or VBR-like protocol, such buffer space may be designated $N_i'$ for a connection along its normal path and $B_i'$ along its backup path. The connection admission procedure, described with respect to FIG. 4, would maintain the quantities $A'(j)$ and $A'(j;f)$ in addition to $A(j)$ and $A(j;f)$. Moreover, the quantities $A'(j)$ and $A'(j;f)$ would be defined the same as $A(j)$ and $A(j;f)$, but $N_i$ and $B_i$ would be replaced by $N_i'$ and $B_i'$, respectively. As will be obvious to those of ordinary skill in the art, other extensions of a system and method in accordance with the invention are also possible to provision and monitor other network capacities.

Figure 5:
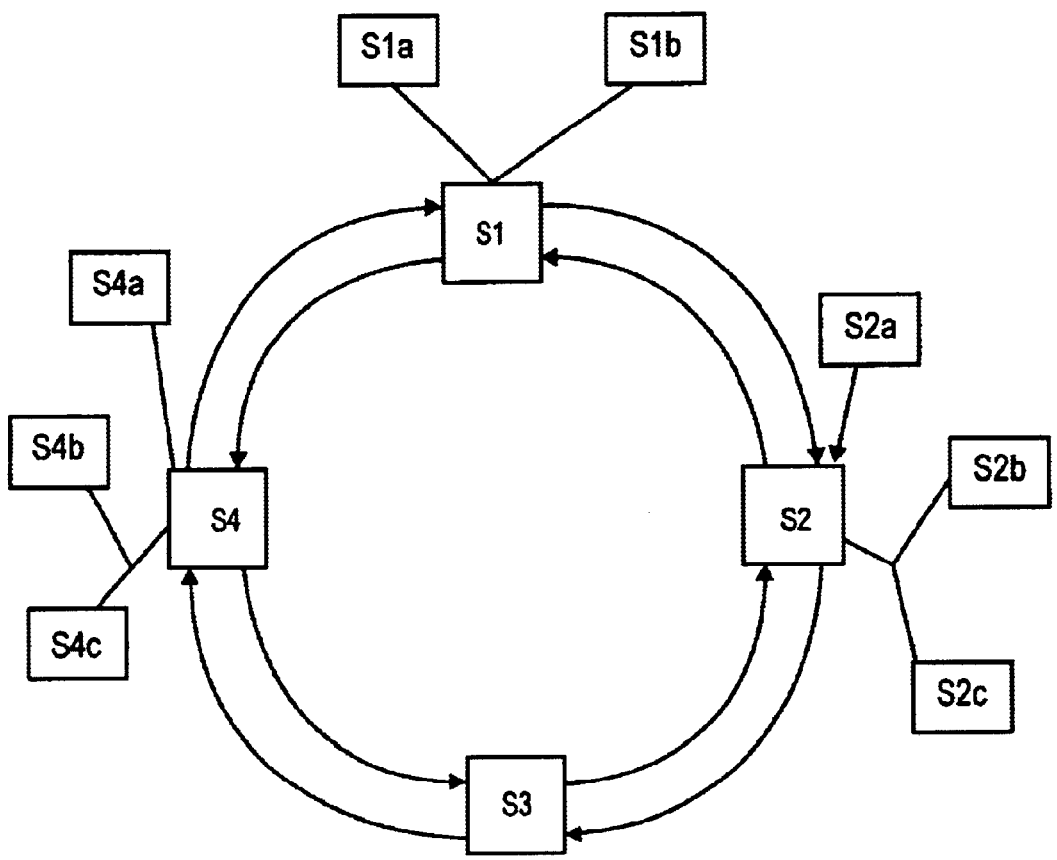
FIG. 5 is a generalized block diagram of a ring-tree topology in accordance with another embodiment of the invention.

An embodiment of the invention has been described with respect to a ring topology for convenience of illustration only. A system and method in accordance with the invention is easily extended to other topologies, such as a ring-tree topology, shown in FIG. 5, or a general mesh topology. With the ring-tree topology (FIG. 5), a ring topology such as that of FIG. 1 is arranged with the addition of trees of nodes coupled to one or more of the ring nodes respectively. The tree links may be bi-directional. A system and method in accordance with an embodiment of the invention would track the transmission rate $A(j)$ reserved on the tree links, and, when a new connection i is admitted, update $A(j)$ with the added rate for every tree link through which the connection passes. Since the tree links are always used, in the presence or absence of a ring failure, there is no need to track $A(j;f)$ for tree links j.

With a general mesh topology, for every connection i, a normal path $n_i$ and a backup path $b_i$ would be defined. As described with respect to the ring topology, in an embodiment the normal path would be selected to be the one with the largest spare transmission rate. The backup path is selected to have a minimal (if any) intersection with the normal path and to also have a large spare transmission rate. Of course, the precise selection procedure of the normal and backup paths will depend upon the network topology utilized. Still, the quantities $A(j)$ and $A(j;f)$ are maintained.

Figure 6:
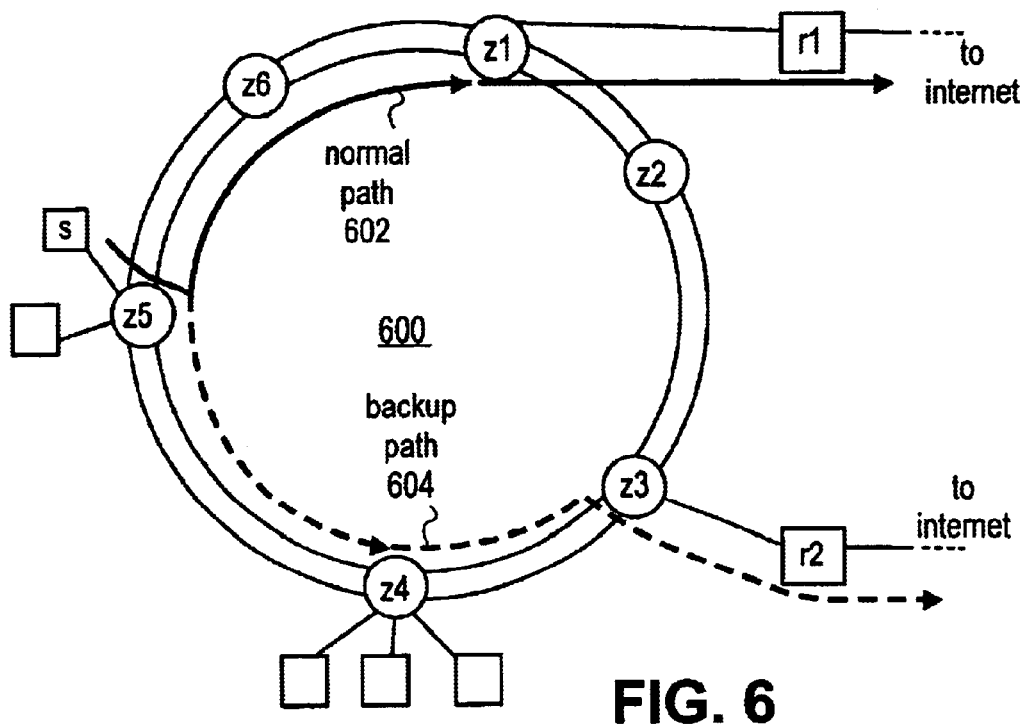
FIG. 6 is a generalized block diagram of a network in accordance with an embodiment of the invention having dual attachments to an external network and illustrates the paths of a connection formed from node S to the external network.

Another embodiment of the invention addresses the possibility of a doubly attached ring (or other network typology). FIG. 6 illustrates a ring 600 having a plurality of nodes Z1–Z6. The ring has two attachments to an external network, such as the Internet: one attachment from node Z1 through router r1 and a second attachment from node Z3 through router r2.

As shown is FIG. 6, for a connection from an off-ring node S to the Internet, two paths are established: a normal path 602, shown through r1 as a solid line, and a backup path 604, shown through r2 as a dashed line. The normal path 602 and backup path 604 have a minimal number of links and nodes in common to improve reliability and are determined much as described previously.

Figure 7:
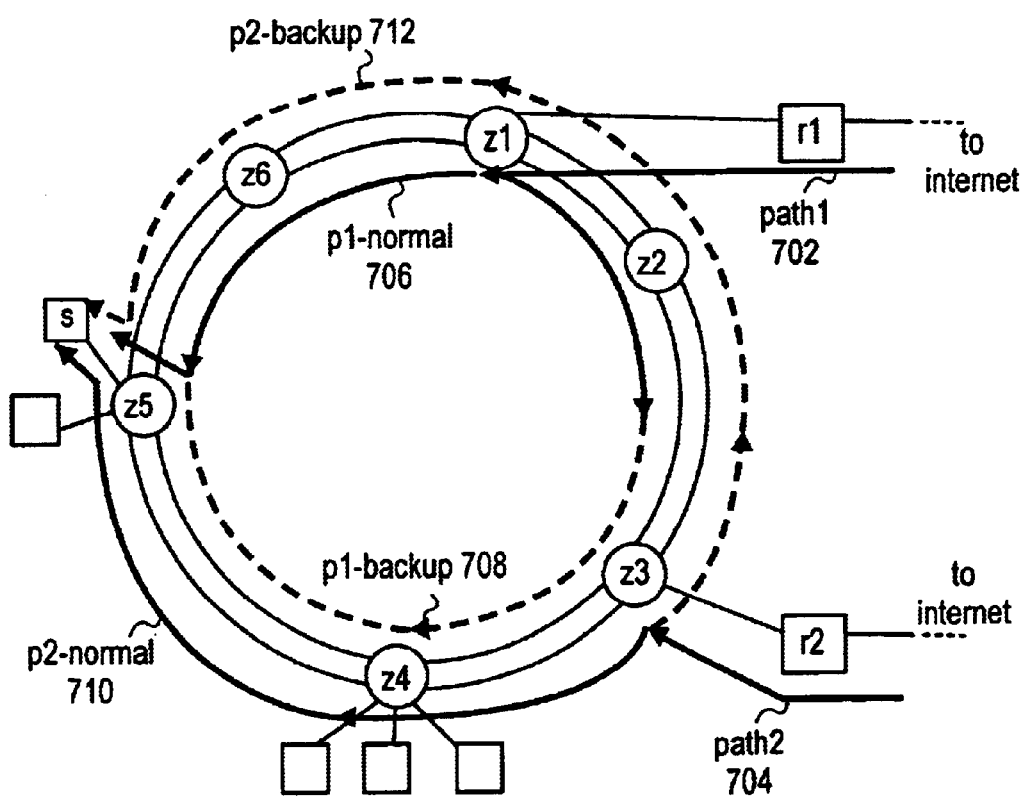
FIG. 7 shows the network of FIG. 6 and illustrates the paths of a connection formed from an external network to node S in accordance with an embodiment of the invention.
Figure 8:
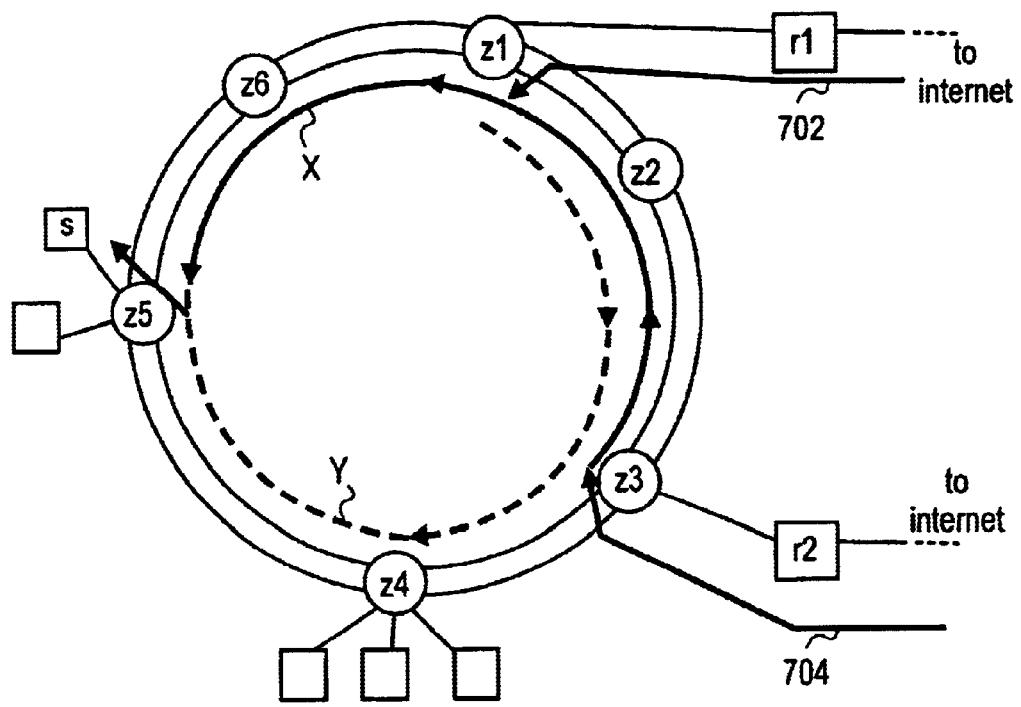
FIG. 8 illustrates the network of FIGS. 6 and 7 and shows the paths for a connection from an external network to node S in accordance with another embodiment of the invention.

For packets arriving from the Internet destined for node S, provisioning paths in the most economical fashion is more problematic. As shown in FIG. 7, packets may arrive from either r1 (on path 1 702) or r2 (on path 2 704). Thus, following the procedures described previously, a normal path (p1-normal 706) and a backup path (p1-backup 708) would need to be established from Z1 to S. Similarly, a normal path (p2-normal 710) and a backup path (p2-backup 712) need be established from Z3 to S. In FIG. 7, the normal paths 706 and 710 are shown with thick solid lines and the backup paths 708 and 712 are shown with thick dashed lines. Hence, the network 600 needs to maintain four queues for this incoming Internet traffic destined for the same node. Nonetheless, in accordance with the invention, it is recognized that the normal path for path 1, p1-normal 706, and the backup path for path 2, p2-backup 712, share many of the same links and nodes. Therefore, referring to FIG. 8, a single label is given each of these two paths, e.g., X. Likewise, a single label is given to p2-normal 710 and p1-backup 712, e.g., Y.

In this manner, upon arrival at the ring, packets are routed along one of two paths to reach node S, either X or Y. Only two queues (X and Y) need be allocated and maintain instead of four (p1-normal, p1-backup, p2-normal, and p2-backup). In other words, a common queue for p1-normal and p2-backup will be designated in at least the nodes that are common to the two paths. Likewise, a common queue for p2-normal and p1-backup will be designated in at least the nodes that are common to those two paths. All traffic arriving at node Z1 in absence of a failure will be routed along path X, but routed along path Y in the event of a failure on path X between nodes Z1 and Z5. All traffic arriving at node Z3 will be routed along path Y in absence of a failure, but along path X in the event of a failure on path Y between nodes Z3 and Z5. Such a method in accordance with the invention will be useful whenever there are more than two paths for a connection and at least two of those paths overlap with more than a minimal number of nodes or links.

Further, using such a 2-queue system minimizes wasted resources. For instance, assume the normal path for each of path 1 and path 2 requires a bandwidth of 10 and that each backup path requires a bandwidth of 5.

Figure 9A:
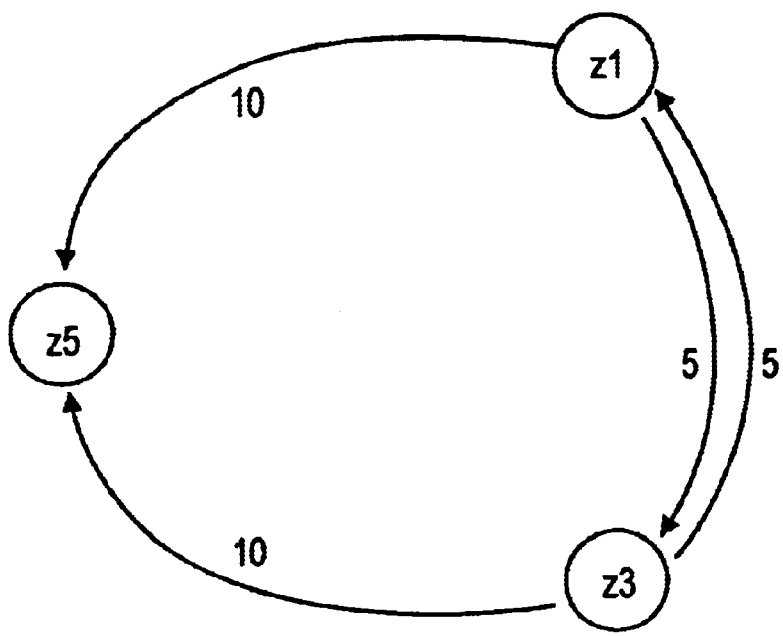
FIG. 9a shows an example of allocated resources if using paths as shown in FIG. 8 in accordance with an embodiment of the invention.
Figure 9B:
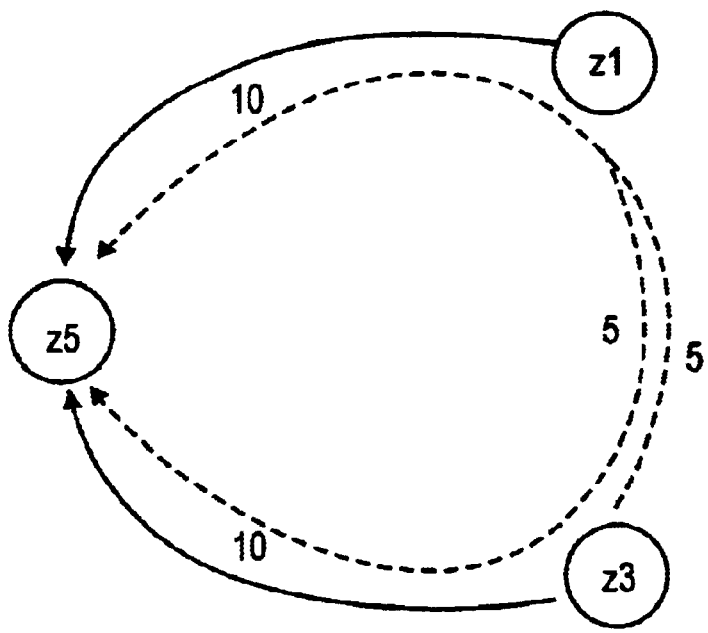
FIG. 9b shows an example of required resources if using paths as shown in FIG. 7 in accordance with an embodiment of the invention.

The two paths (e.g., p1-normal and p2-backup) will not generally be used simultaneously. Thus, the total bandwidth that will ever be required on any link will be 10 or less, as shown in FIG. 9a. In contrast, using a 4-queue system, the bandwidth reserved on each link for the respective paths would be 15, as shown in FIG. 9b.

Therefore, as system and method in accordance with the invention has been disclosed that can guarantee reliable quality of service, but uses resources more efficiently than ATM, SONET, and other known art. Instead of duplicating all the bit streams between pairs of switches on network rings (or other topology), a system and method in accordance with the invention sets aside the transmission rate required to re-route only the bit streams that are interrupted by a failure. Resources re-routed from a particular link are then made available for other re-routed connections. As well, doubly attached networks can use resources reliably and efficiently, without maintenance of duplicative paths.

It should be understood that the particular embodiments described above are only illustrative of the principles of the present invention, and various modifications could be made by those skilled in the art without departing from the scope and spirit of the invention. Thus, the scope of the present invention is limited only by the claims that follow.

What is claimed is:

1. A method for use in a network including a plurality of nodes and a plurality of links interconnecting the nodes, comprising:

for each of a plurality of virtual connections, establishing a normal path and backup path, including:
  for each normal path, evaluating whether each link in said normal path has adequate resources to accommodate said respective virtual connection;
  for each backup path, evaluating whether each link in said backup path has adequate resources to accommodate said respective virtual connection in the event of a failure f in said normal path;
communicating information for said respective virtual connection on said normal path, but not said backup path, in the absence of a failure in said normal path;
in the event of a failure f in said normal path, communicating information for said respective virtual connection on said backup path;
establishing a virtual connection between an external network and a destination node via a first attachment through a first node and a second attachment through a second node, wherein information from said external network for said destination node will arrive at said network at either said first node or said second node including
establishing a first normal path from said first node to said destination node and a first backup path from said first node to said destination node, and
establishing a second normal path from said second node to said destination node and a second backup path from said second node to said destination node,
wherein more than a minimal number of links and nodes in said first normal path are common with the links and nodes in said second backup path, and
wherein more than a minimal number of links and nodes in said second normal path are common with the links and nodes of said first backup path;
designating a common queue for said first normal path and said second backup path in the nodes that are common between said first normal path and said second backup path; and
designating a common queue for said second normal path and said first backup path in the nodes that are common between said second normal path and said first backup path.

2. A method for use in a network including a plurality of nodes and a plurality of links interconnecting the nodes, comprising:

establishing a virtual connection between an external network and a destination node via a first attachment through a first node and a second attachment through a second node, wherein information from said external network for said destination node will arrive at said network at either said first node or said second node, said step of establishing including:
  establishing a first normal path from said first node to said destination node and a first backup path from said first node to said destination node, and
  establishing a second normal path from said second node to said destination node and a second backup path from said second node to said destination node,
  wherein more than a minimal number of links and nodes in said first normal path are common with the links and nodes in said second backup path, and
  wherein more than a minimal number of links and nodes in said second normal path are common with the links and nodes of said first backup path;
  designating a common queue for said first normal path and said second backup path in the nodes that are common between said first normal path and said second backup path; and designating a common queue for said second normal path and said first backup path in the nodes that are common between said second normal path and said first backup path.

3. The method of claim 2, further including:

establishing a normal path from said destination node to said external network via said first node; and establishing a backup path from said destination node to said external network via said second node.

4. The method of claim 2, wherein said respective backup paths are used only in the event of a failure on the respective normal path.

5. A method for use in a network including a plurality of nodes and a plurality of links interconnecting the nodes, comprising:

receiving a request to establish a virtual connection, the requested virtual connection having a normal path with a normal transmission rate N and a backup path with a backup transmission rate B;

selecting at least one potential normal path as a candidate for the normal path;

determining a spare transmission rate for the potential normal path;

comparing the spare transmission rate for the potential normal path with the normal transmission rate N;

determining whether the potential normal path is the normal path based, at least in part, on the comparison between the spare transmission rate and the normal transmission rate N;

selecting at least one potential backup path as a candidate for the backup path;

determining a spare transmission rate for the potential backup path;

determining whether the spare transmission rate for the potential backup path is negative; and determining whether the potential backup path is the backup path based, at least in part, on the determination of whether the spare transmission rate for the potential backup path is negative.

6. The method of claim 5, wherein determining a spare transmission rate for the potential normal path comprises:

determining a spare transmission rate for each link of the potential normal path; and selecting one of the determined spare transmission rates for each link to be the spare transmission rate for the potential normal path.

7. The method of claim 6, wherein selecting one of the determined spare transmission rates for each link to be the spare transmission rate for the potential normal path comprises selecting the determined spare transmission rate with the lowest value to be the spare transmission rate for the potential normal path.

8. The method of claim 7, wherein determining a spare transmission rate for the potential backup path comprises:

determining a spare transmission rate for each link of the potential backup path based, at least in part, on a transmission rate each link will provide during a failure of a network element; and selecting one of the determined spare transmission rates for each link to be the spare transmission rate for the potential backup path.

9. The method of claim 8, wherein selecting one of the determined spare transmission rates for each link to be the spare transmission rate for the potential backup path comprises selecting the determined spare transmission rate with the lowest value to be the spare transmission rate for the potential backup path.

10. An article of manufacture comprising:

an electronically accessible medium providing instructions that, when executed by an apparatus, cause the apparatus to receive a request to establish a virtual connection, the requested virtual connection having a normal path with a normal transmission rate N and a backup path with a backup transmission rate B;

select at least one potential normal path as a candidate for the normal path;

determine a spare transmission rate for the potential normal path;

compare the spare transmission rate for the potential normal path with the normal transmission rate N;

determine whether the potential normal path is the normal path based, at least in part on the comparison between the spare transmission rate and the normal transmission rate N;

select at least one potential backup path as a candidate for the backup path;

determine a spare transmission rate for the potential backup path;

determine whether the spare transmission rate for the potential backup path is negative; and determine whether the potential backup path is the backup path based, at least in part on the determination of whether the spare transmission rate for the potential backup path is negative.

11. The article of manufacture of claim 10, wherein the instructions that cause the apparatus to determine a spare transmission rate for the potential backup path further cause the apparatus to determine a spare transmission rate for each link of the potential backup path based, at least in part, on a transmission rate each link will provide during a failure of a network element; and to select one of the determined spare transmission rates for each link to be the spare transmission rate for the potential backup path.

12. The article of manufacture of claim 11, wherein the instructions that cause the apparatus to select one of the determined spare transmission rates for each link to be the spare transmission rate for the potential backup path further cause apparatus to select the determined spare transmission rate with the lowest value to be the spare transmission rate for the potential backup path.

* * * * *